US010818287B2

(12) United States Patent
White et al.

(10) Patent No.: US 10,818,287 B2
(45) Date of Patent: Oct. 27, 2020

(54) AUTOMATED QUICK TASK NOTIFICATIONS VIA AN AUDIO CHANNEL

(71) Applicant: Microsoft Technology Licensing, LLC, Redmond, WA (US)

(72) Inventors: Ryen William White, Woodinville, WA (US); Mathieu Etienne Jacques Audouin, Kirkland, WA (US); Patrick Pantel, Bellevue, WA (US); Nikrouz Ghotbi, Redmond, WA (US); Anantha Deepthi Uppala, Mercer Island, WA (US); Vanessa Graham Murdock, Kirkland, WA (US); Mark James Encarnacion, Bellevue, WA (US); Nirupama Chandrasekaran, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/877,237

(22) Filed: Jan. 22, 2018

(65) Prior Publication Data
US 2019/0228766 A1    Jul. 25, 2019

(51) Int. Cl.
*G10L 15/22*    (2006.01)
*G06Q 10/10*    (2012.01)
(Continued)

(52) U.S. Cl.
CPC ............... *G10L 15/22* (2013.01); *G06F 3/16* (2013.01); *G06F 40/35* (2020.01); *G06F 40/40* (2020.01);
(Continued)

(58) Field of Classification Search
CPC . G10L 15/22; G06F 3/16; G06F 40/35; G06F 40/40
See application file for complete search history.

(56) References Cited

U.S. PATENT DOCUMENTS 7,155,729 B1 *  12/2006  Andrew .............. G06F 9/44505
                                                 719/318
8,639,552 B1 *   1/2014  Chen .................... G06F 9/4881
                                                 705/7.21
(Continued)

FOREIGN PATENT DOCUMENTS

EP          1679828 A1       7/2006

OTHER PUBLICATIONS

"International Search Report and Written Opinion Issued in PCT Application No. PCT/US2019/012796", dated Mar. 18, 2019, 13 Pages.

*Primary Examiner* — William L Bashore
*Assistant Examiner* — Gregory A Distefano
(74) *Attorney, Agent, or Firm* — Shook, Hardy & Bacon L.L.P.

(57) ABSTRACT

Aspects of the technology described herein provide an efficient user interface that enables users to respond to tasks quickly by providing automated quick task notifications via an audio channel. An audio channel quick task system includes components for recognizing and extracting quick tasks from content (e.g., interpersonal communications, composed content, line of business (LOB) application documents), and for prioritizing and routing the quick tasks to the user via an audio channel at an appropriate and relevant time. The system is enabled to process a user response, determine an action for handling the quick task, and execute the action on behalf of the user (e.g., pass a reply to a requestor, pass an instruction to an application or service, queue the quick task notification, delegate the quick task to another user or bot, forward the quick task to a companion device, or launch an application on a companion device).

20 Claims, 8 Drawing Sheets

(51) Int. Cl.
   *G06F 40/35*   (2020.01)
   *G06F 40/40*   (2020.01)
   *G06F 3/16*    (2006.01)

(52) U.S. Cl.
   CPC ......... *G06Q 10/107* (2013.01); *G06Q 10/109* (2013.01); *G06Q 10/1093* (2013.01); *G06Q 10/1097* (2013.01)

(56) References Cited

U.S. PATENT DOCUMENTS

| | | | |
|---|---|---|---|
| 8,949,275 B1* | 2/2015 | Aasuri-Maringanti | ............ G06F 17/30716 707/791 |
| 2002/0087649 A1* | 7/2002 | Horvitz | ............... G06Q 10/107 709/207 |
| 2012/0226806 A1* | 9/2012 | Knight | .................. G06F 9/4843 709/224 |
| 2012/0229276 A1* | 9/2012 | Ronkainen | ............... G08B 7/06 340/540 |
| 2014/0030684 A1* | 1/2014 | Steinmetz | .............. A61B 5/486 434/247 |
| 2014/0033071 A1* | 1/2014 | Gruber | ............... G06Q 10/1097 715/752 |
| 2014/0282003 A1* | 9/2014 | Gruber | ................... G06F 3/167 715/727 |
| 2015/0356519 A1 | 12/2015 | Wansley et al. | |
| 2016/0095083 A1* | 3/2016 | Park | ................ H04M 1/72597 455/458 |
| 2017/0277740 A1 | 9/2017 | Ghotbi et al. | |
| 2017/0372253 A1 | 12/2017 | Nandi et al. | |

\* cited by examiner

AUTOMATED QUICK TASK NOTIFICATIONS VIA AN AUDIO CHANNEL

BACKGROUND

A technical problem associated with managing tasks is an inefficient user interface for enabling users to respond to tasks quickly. Users of computing devices typically have a backlog of pending tasks that include a combination of tasks, such as requests received in electronic communications from others, commitments made to others by the users, to-do list items created explicitly by the users, or tasks that have been automatically recognized and added to users' to-do lists on behalf of the users. Some pending tasks can be handled quickly, such as with a brief voice reply (e.g., yes, no, agree, approve, deny), a simple action (e.g., making a call, sending a short message), or a delegation to another individual. However, these types of tasks are typically stored intermixed with the users' other communications and with more complex tasks in the users' to-do lists, which can make it more difficult for users to identify which pending tasks can be handled quickly and can be removed from the users' pending tasks lists. Accordingly, although such tasks could be quickly handled, users oftentimes persist these tasks in their email mailboxes or task lists until they find an opportunity to act on them.

Some previous solutions involve flagging tasks inline in an email mailbox or in separate lists. However, these solutions require users to access a specific application and locate a specific task before the user can act on it. For example, a typical means of handling a pending task is to log onto a computing device, open an application, and perform an action, such as type a reply to a request, make a call, etc. As can be appreciated, these previous solutions have a high interaction cost and do not provide for enabling users to quickly handle pending tasks via audio channels.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the present disclosure provide for systems and methods to provide a more efficient user interface that enables users to respond to tasks quickly. Aspects include an audio channel quick task system that generates automated quick task notifications that are exposed to users via an audio channel. An audio channel quick task system includes components for recognizing and extracting quick tasks from digital content, such as interpersonal communications (e.g., emails, text messages, instant messages, phone calls, social media posts), composed content (e.g., to-do lists, notes documents, word processing documents), line of business (LOB) application documents, and the like, and for prioritizing and routing the quick tasks to the user via an audio channel at an appropriate and relevant time. In response to receiving a user response to an audibly-presented quick task, the audio channel quick task system processes the user response and passes a reply to a sender or requestor, passes an instruction to an application or service, stores the quick task a queue for later notification to the user, delegates the quick task to another user or bot, forwards the quick task to a companion device, or launches an application on a companion device for handling the quick task.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process. The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
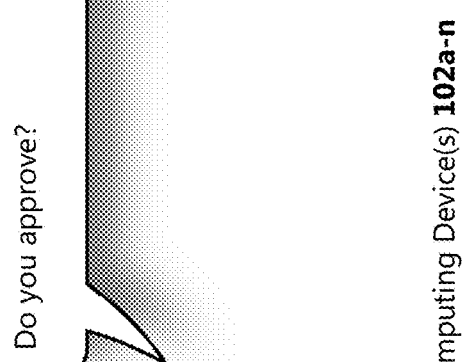
FIG. 1 is a block diagram showing an example operating environment for implementation of the present disclosure.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for providing exposure of quick tasks via an audio channel. As used herein and as will be described in more detail below, a quick task is a task (e.g., to-do list item, a request, commitment, or question extracted from digital content) that is amenable to being audibly presented to a user through a speaker and processed with a quick action. An audio channel quick task system includes components for recognizing and extracting quick tasks from digital content, such as interpersonal communications (e.g., emails, text messages, instant messages, phone calls, social media posts), composed content (e.g., to-do lists, notes documents, word processing documents), line of business (LOB) application documents, and the like, and for prioritizing and routing the quick tasks to the user via an audio channel at an appropriate and relevant time. In response to receiving a user response to an audibly-presented quick task, the audio channel quick task system processes the user response and passes a reply to a sender or requestor, passes an instruction to an application or service, stores the quick task a queue for later notification to the user, delegates the quick task to another user or bot, forwards the quick task to a companion device, or launches an application on a companion device for handling the quick task. Aspects of the technology described herein provide a more efficient user interface for enabling users to respond to tasks quickly. For example, a computing device on which the audio channel quick task system operates can help a user execute tasks in a backlog of pending tasks, thus enabling the executed tasks to be marked as completed and removed from memory. Additionally, in some implementations, quick task identification and prioritization are performed on one or more server computers, thus reducing processing of task items on a client computing device. Further, a user can reduce usage of a client computing device's processing resources for searching for certain task items that he/she can complete.

With reference now to FIG. 1, a block diagram is provided showing an example operating environment 100 in which aspects of the present disclosure can be employed, for example, to implement one or more of the components of an audio channel quick task system 200 as illustrated and described with reference to FIG. 2. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, functions can be carried out by a processor executing instructions stored in memory. As illustrated, the example operating environment 100 includes one or more client computing devices 102a-n (generally 102), a number of data sources 104a-n (generally 104), at least one server 106, sensors 108a,b,c (generally 108), and a network 110 or a combination of networks. Each of the components illustrated in FIG. 1 can be implemented via any type of computing device, such as the computing devices 500, 600, 705a,b,c described in reference to FIGS. 5, 6A, 6B, and 7. As an example, the one or more client computing devices 102 can be one of various types of computing devices, such as tablet computing devices, desktop computers, mobile communication devices, laptop computers, laptop/tablet hybrid computing devices, large screen multi-touch displays, speaker devices, vehicle computing systems, gaming devices, smart televisions, wearable devices, internet of things (IoT) devices, etc.

The components can communicate with each other via a network 110, which can include, without limitation, one or more local area networks (LANs) or wide area networks (WANs). In some examples, the network 110 comprises the Internet and/or a cellular network, amongst any of a variety of possible public or private networks. As should be appreciated, any number of client computing devices 102, data sources 104, and servers 106 can be employed within the example operating environment 100 within the scope of the present disclosure. Each can comprise a single device or a plurality of devices cooperating in a distributed environment. For example, the server 106 can be provided via multiple devices arranged in a distributed environment that collectively provide various functionalities described herein. In some examples, other components not shown can be included within the distributed operating environment 100.

According to an aspect, the one or more data sources 104 can comprise data sources or data systems that are configured to make data available to any of the various components of operating environment 100 or of the example system 200 described below with reference to FIG. 2. In some examples, the one or more data sources 104 are discrete from the one or more client computing devices 102 and the at least one server 106. In other examples, the one or more data sources 104 are incorporated or integrated into at least one of the client computing devices 102 or servers 106.

According to an aspect, the sensors 108 can include various types of sensors including, but not limited to: cameras, microphones, global positioning systems (GPS), motion sensors, accelerometers, gyroscopes, network signal systems, physiological sensors, and temperature or other environmental factor sensors. For example, sensors 108 can be used to detect data and make the detected data available to other components. Detected data can include, for example, home-sensor data, appliance data, GPS data, vehicle signal data, traffic data, weather data, wearable device data, network data, gyroscope data, accelerometer data, payment or credit card usage data, purchase history data, or other sensor data that can be sensed or otherwise detected by a sensor 108 (or other detector component(s)). According to an aspect, data detected by the sensors 108 (alone or in combination with data collected from the one or more data sources 104) can be used as context information. As used herein, the term "context information" describes any information characterizing a situation related to an entity (e.g., the user) or to an interaction between the user and other users, applications, or the surrounding environment.

Figure 2:
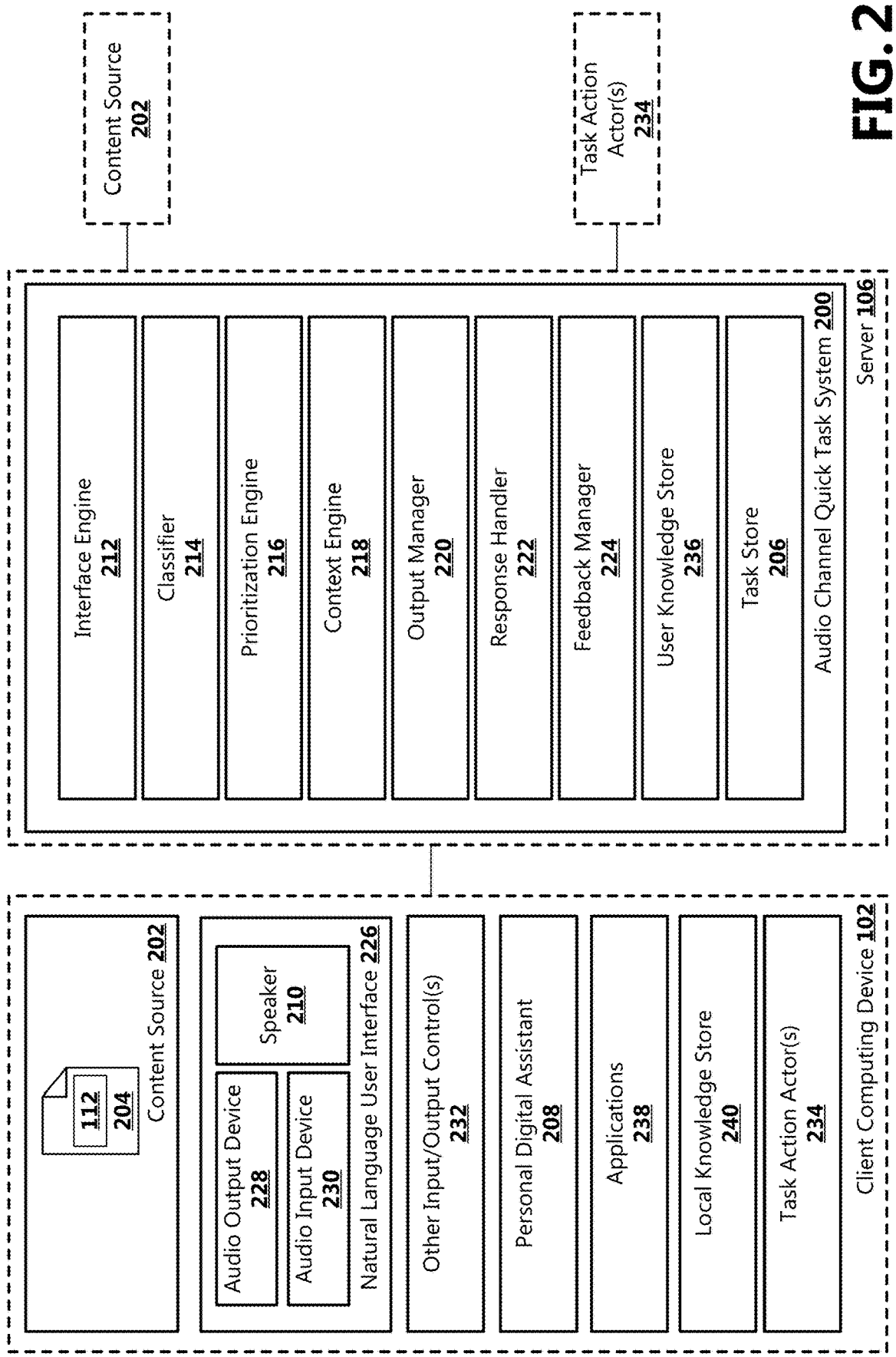
FIG. 2 is a block diagram showing an example computing architecture for implementing aspects of the present disclosure.

The example operating environment 100 can be used to implement one or more of the components of the audio channel quick task system 200 described in FIG. 2, including components for recognizing, extracting, prioritizing, and routing quick tasks 112. Aspects of the example audio channel quick task system 200 provide for automated detection and extraction of a quick task 112 from a digital content item, use of context data and attributes of the quick task to prioritize the quick task and to determine whether to present a highly-ranked (e.g., according to prioritization) quick task to the user via an audio channel, notification of a highly-ranked quick task via a speaker, receipt of a response from the user, and processing of the quick task based on the user response.

A block diagram is provided that shows aspects of an example computing system architecture suitable for implementing various aspects of the present disclosure. The audio channel quick task system 200 represents only one example of a suitable computing system architecture. Other arrangements and elements can be used in addition to or instead of the elements shown. As should be appreciated, elements described herein are functional entities that can be implemented as discrete or distributed components, or in conjunction with other components, and in any suitable combination or location. For example, the components of the audio channel quick task system 200 can operate on one or more computing devices 102, servers 106, can be distributed across one or more computing devices 102 and servers 106, or can be implemented in the cloud. In some examples, one or more of the components of the audio channel quick task system 200 are distributed across a network 110 or a combination of networks. In some examples, functions performed by components of the audio channel quick task system 200 are exposed via an API (Application Programming Interface). In some examples, components of the audio channel quick task system 200 receive data from other applications, systems, or services via making calls to APIs of the other applications, systems, or services. FIG. 2 shows a mixed environment where components of the audio channel quick task system 200 are implemented on a server 106 and where quick tasks are communicated through a client computing device 102 that also receives user feedback; however, aspects are not limited to this example. In one example, components of the audio channel quick task system 200 are implemented on a personal digital assistant server.

In various implementations, the client computing device 102 includes a personal digital assistant 208 that can help the user perform tasks through the one or more computing devices, such as the client computing device 102 and other devices associated with the user. It should be noted that implementations of the technology described herein are not limited to use with a personal digital assistant. The technology could be deployed with a variety of applications 238, such as text applications, email applications, calendar applications, social media applications, and such. In one aspect, a user is able to designate the client computing devices 102 with which he or she is associated. In another aspect, a user is associated with each client computing device 102 on which an instance of the personal digital assistant 208 is installed and on which the user has registered his or her account information or user identification with the personal digital assistant.

Personal digital assistant functionality can be provided as or by a stand-alone application, part of an application 238, or part of an operating system of the client computing device 102. According to an aspect, the personal digital assistant 208 employs a natural language user interface (UI) 226 that can receive spoken utterances (e.g., voice control, commands, queries, prompts) from a user that are processed with voice or speech recognition technology. As should be appreciated, many computing device users are increasingly using hands-free interfaces (e.g., smart speaker devices, vehicle computing systems, wearable devices, ear buds) that allow users to interface computing devices through hands-free technologies, such as speech recognition. These hands-free interfaces can be advantageously used to allow uses to handle quick tasks 112, rather than requiring users to log onto a computing device, open an application, and perform an action, such as type a reply to a request, make a call, etc.

For example, the natural language UI 226 can include an audio input device 230, such as a microphone. That is, the client computing device 102 comprises an audio input device 230 that can be an internal or integral part of the client computing device, or can be an external source (e.g., USB microphone, wirelessly-paired microphone). The audio input device 230 functions to capture audio input, such as spoken utterances from the user, which can be used to invoke various actions, features, and functions of the audio channel quick task system 200, to invoke various actions, features, and functions on the client computing device 102, to provide inputs to systems and applications 238, and the like. In some cases, the spoken utterances can be utilized on their own in support of a particular user experience, while in other cases the spoken utterances can be utilized in combination with other non-voice commands or inputs, such as inputs implementing other input/output (I/O) controls 232, such as physical controls on the device or virtual controls implemented on a UI or as inputs using gestures.

The personal digital assistant 208 can support various functions, which can include interacting with the user (e.g., through the natural language UI and other graphical UIs); performing tasks (e.g., making note of appointments in the user's calendar, sending messages and emails); providing services (e.g., answering questions from the user, mapping directions to a destination); gathering information (e.g., finding information requested by the user about a book or movie, locating the nearest Italian restaurant); operating the client computing device 102 (e.g., setting preferences, adjusting screen brightness, turning wireless connections on and off); and various other functions. The functions listed above are not intended to be exhaustive and other functions may be provided by the personal digital assistant 208. The personal digital assistant 208 can monitor other applications 238 and operating system functions. For example, the personal digital assistant 208 is able to monitor or have access to sensor data from one or more sensors 108 on the client computing device 102. For example, the personal digital assistant 208 can have access to accelerometer data, gyro data, GPS location data, wireless network location data, image data from a camera, sound data generated by an audio output device 228, touch data from a touchscreen, and other information. Sensor data from these sensors 108 can be used to determine context associated with the user or the client computing device 102, for example, for determining whether to audibly expose a quick task 112 to the user. The personal digital assistant 208 can monitor user activities within one or more other applications 238 and store a record of this activity forming a personal data record. As described above, the client computing device 102 can include a plurality of other hardware sensors.

Further, the client computing device 102 includes an audio output device 228 (e.g., sound card, sound board, audio card), which functions to produce sound on the computing device that can be heard through speakers 210 of various forms, such as an internal or integral part of the client computing device or an external source (e.g., USB speaker, wirelessly-paired speaker, wired/wireless headphones). In various implementations, the audio output device 228 is embodied as an expansion card or integrated circuit. The audio output device 228 is employed by the audio channel quick task system 200 to audibly expose or communicate quick tasks 112 to the user.

A local knowledge store 240 stores details of events performed through the client computing device 102 or other devices running an instance of the personal digital assistant 208. For example, the user can read an email on his or her mobile device causing a record of an "email read" event to be created. The "email read" record can describe a time and date when the email was read along with details describing the email, such as the recipients, subject line, description of attachments, etc. Similar information can be used to describe a text event. A call event can record the time and date of a call, call duration, and contact information (e.g., name, phone number) for the other person on the call. The contact information can be determined from caller ID information or taken from a local contact data store when the phone number matches an existing contact's phone number. This information can be communicated to the user knowledge store 236 and synchronized with local knowledge stores 240 on other user client computing devices 102.

In another example, the personal digital assistant 208 can generate a walking event that is stored in the local knowledge store 240. For example, the absence of light from a camera can indicate that the user's mobile phone is in the user's pocket or bag and accelerometer data can indicate that the user is walking with the phone. The start time and stop time can be recorded to describe the walk event along with geographic location and/or route. The geographic information can be gathered from a GPS or other location technology within the phone. In another example, a drive event can describe an instance of the user traveling in a vehicle. As with the walking event, the start and stop time of the drive event can be recorded along with geographic information such as a route. Additional information can include businesses visited before, after, or during the drive event. Geographic location information can be used to identify a business. A specific type of drive event may include a public transportation event. The user's use of public transportation may be identifiable upon the user accessing a Wi-Fi® connection provided by the transportation company. Further, route information can be analyzed to determine that the user is on public transportation. For example, the route information including stops can be analyzed to determine that the route follows a train route and the stops coincide with train stops. Additionally, payment information may be analyzed to determine that public transportation is being used, as well as to gather additional details about the public transportation. In one instance, the payment information is provided through a near field communication system in the user's phone. As with other events, payment information, calendar information, email information, and other data can be combined to determine that a specific event record should be created and to provide details. The calendar information can include a calendar description of the event. The email information can include a discussion of the event with friends, a payment receipt, or other information related to the event. Information recorded by the personal digital assistant 208 may be considered user knowledge and stored in user knowledge store 236. The user knowledge can be used to identify quick tasks 112, to determine user context and a client computing device 102 associated with the user, and to determine whether the user context and client computing device context are amenable with audibly exposing a quick task to the user.

The user knowledge store 236 can include detailed information about the user, such as the user's relationship to other users and the names and online or electronic identification information for the related users. For example, the knowledge store may identify a user's spouse, parents, children, coworkers, neighbors, or other groups of people. The user knowledge store 236 may also include information about the user's interests, activities, and other relevant information. The user knowledge store 236 can include a user's home location and frequent locations visited, such as shopping locations, restaurants, entertainment locations, and such. The user knowledge store 236 can include information about the user's work location and hierarchical job information, such as the user's manager and who directly reports to the user. Hierarchical work information can help identify whether a task is important as well as its urgency. For example, a request from the user's manager may be more urgent and important than a request received from a coworker.

According to an aspect, the audio channel quick task system 200 includes an interface engine 212 illustrative of a software module, software package, system, or device operative or configured to communicate with the personal digital assistant 208, with one or more applications 238, with the local knowledge store 240, and with one or more content sources 202 over the network 110 for accessing and collecting content items 204 from the one or more content sources 202. According to examples, the content items 204 are user-specific content items (e.g., communications directed to the user, content composed by the user). In some examples, the user-specific content items 204 are received from one or more client computing devices 102. In other examples, a content item 204 comprising a quick task 112 is sent to the audio channel quick task system 200 from a content source 202 from which the quick task is created. In other examples, the interface engine 212 communicates with one or more online services, such as the user's social network, web-based email, text messages (SMS), instant messages, web-based content stores, and other services for collecting user-specific content items 204. For example, the interface engine 212 can make an API call to a content source 202 with a request for information or functionality that can be provided by the content source. In some examples, the interface engine 212 can make a call to an API of a content source 202 for requesting new or updated content items 204 which can be parsed by a classifier 214 for identifying quick tasks 112. In other examples, the interface engine 212 can make an API call to a third-party task identification system configured to parse content items 204 for identifying tasks and then receive identified tasks and associated metadata from the third-party task identification system. The content items 204 can be fed into the classifier 214 to identify quick tasks 112.

In one aspect, the interface engine 212 provides a privacy interface for enabling the user to specify what types of content items 204 may or may not be communicated to the audio channel quick task system 200 or otherwise choose to identify quick tasks 112. The privacy interface can allow the user to opt in or opt out of the program entirely. Consent can take several forms. Opt-in consent can impose on the user to take an affirmative action before the data is collected. Alternatively, opt-out consent can impose on the user to take an affirmative action to prevent the collection of data before that data is collected. The privacy interface may also allow the user to specify the associated content items 204 that may be analyzed or not to generate quick task notifications. For example, the user may authorize the audio channel quick task system 200 to use emails or texts received from or sent to people in the user's contact database or social network. As another example, the user may authorize the audio channel quick task system 200 to only use emails or texts received from or sent to people in the user's enterprise contact database.

According to an aspect, a quick task 112 can take the form of a composed task item that explicitly states a task action (e.g., send RSVP to Carol) or includes text from which a request for the user to perform a task action or a commitment by the user to perform a task action can be inferred. For example, a quick task 112 can be embodied as a task item added to the user's to-do list, calendar, or other task management tool. As another example, a quick task 112 can be expressed in a communication item or other content item 204. For example, Mike, a co-worker, may send the user a text message stating "call me back," wherein the quick task 112 can be inferred as a request for the user to "call Mike." As another example, a notification may be sent to the user from an LOB application or system, such as a time-off request submitted by an employee to a manager, wherein the quick task 112 can be inferred as a request for the user to "approve the time-off request." As another example, the user may tell another user in an email that the user will send a particular document to the other user, wherein the quick task 112 can be inferred as a commitment by the user to "send the particular document."

As used herein, a content item 204 can include: one or a series (e.g., thread) of communication items, such as email messages, text messages, chat messages, notifications (e.g., from an LOB application or third-party application), social media messages, etc.; audio feeds (e.g., from phone calls, voicemail messages, or verbal requests to a personal digital assistant 208); a to-do list; an electronic calendar entry; a composed document (e.g., a notes document, a word processing document); or other type of content item provided by a content source 202 that can include an explicitly-defined task, text expressing a commitment of a task action made by the user, or text expressing a request for a task action directed to the user from another user. According to an aspect, a content item 204 can include structured or unstructured content items, wherein an unstructured content item is a content item without a schema for communicating task information. For example, an LOB application may use a schema to communicate travel request information in an email. The schema may be explicitly provided by the author of the email (e.g., in the case of schema.org) or be clearly identifiable from the email (e.g., using HTML tags and layout information). The LOB application communications are structured. Unstructured content items can be written in natural language form and can be processed using natural language processing (NLP) techniques.

A content source 202 can include the personal digital assistant 208, applications 238, such as email applications, calendar applications, social media applications, messaging applications, notes applications, LOB applications (i.e., computer applications that are vital to running an enterprise, such as accounting, human resources (HR), payroll, supply chain management, and resource planning applications), content stores, or third-party applications or services that the audio channel quick task system 200 is in communication with (e.g., via the network 110) and from which content items 204 comprising tasks associated with the user can be accessed.

The interface engine 212 is operative to pass content items 204 to a classifier 214 illustrative of a software module, software package, system, or device operative or configured to identify or extract tasks and task related information and to determine whether identified or extracted tasks are amenable to being presented to a user via an audio channel (e.g., through an audio output device 228 and speaker 210). According to an aspect, the classifier 214 is a computer learning model, such as a neural network or deep neural network model. The classifier 214 is operative to parse content items 204 for making a determination as to whether a task is expressed in the text of the content items, and for making a further determination as to whether an identified task is a quick task 112. As used herein, the term "extract" describes determining or identifying a request or commitment in a content item 204. For example, the classifier 214 can extract a request or commitment from one or a series of text messages, wherein the classifier is determining or identifying a request or commitment from the series of text messages, but is not necessarily removing the request or the commitment from the series of text messages. In other words, the term "extract" in the context used herein, unless otherwise described for particular examples, does not mean to "remove." A process of extracting a request or commitment from a content item 204 can be described as a process of extracting task content. In other words, task content as described herein refers to one or more requests, one or more commitments, or a combination of requests and commitments that are conveyed in the meaning of the content item. In various implementations, the process can include extracting a fragment of text containing a commitment or request. In various implementations, the process can include augmenting extracted task content (e.g., requests or commitments) with identification of people and one or more locations associated with the extracted task content. For example, an extracted request or commitment may be stored or processed with additional information, such as identification of the requester and/or requestee, pertinent location(s), times/dates, etc.

Once identified and extracted by the classifier 214, task content (e.g., the proposal or affirmation of a commitment or request) can be further processed or analyzed to identify or infer semantics of the commitment or request including: identifying the primary owners of the request or commitment (e.g., if not the parties in the communication); the nature of the task content and its properties (e.g., its description or summarization); specified or inferred pertinent dates (e.g., deadlines for completing the commitment or request); relevant responses, such as replies or follow-up messages and their expected timing (e.g., per expectations of courtesy or around efficient communications for task completion among people or per an organization); and information resources to be used to satisfy the request. Such information resources, for example, may provide information about time, people, locations, task action actors 234 and so on. The identified task content and inferences about the task content may be used to drive automatic (e.g., computer generated) services such as reminders, revisions of to-do lists, appointment scheduling, meeting requests, communication responses, document sharing, authorization granting, and other activities.

According to an aspect, the classifier 214 is operative to further process and analyze task content (e.g., the proposal or affirmation of a commitment or request) of a content item 204 to identify or infer whether the task associated with the task content is a quick task 112. As described above and as used herein, a quick task 112 is a task that is amenable to being presented to a user via an audio channel and processed with a quick action (e.g., quick reply, simple action), such as a request that can be handled with a brief voice reply (e.g., "yes," "tell him no," "agree," "approve," "remind me when I get to my office;" "delegate to John"). For example, a quick task 112 can be processed as a reply message to a sender, as an instruction to a task action actor 234, such as an application or service, can be added to a queue (e.g., task store 206), delegated to another user or bot, forwarded to or launched on a companion device (e.g., if audio is not conducive to handling the task), etc.

According to one aspect, amenability to presentation via an audio channel can be determined based on a determination of possible responses to the task, for example, based on training data comprised of requests or commitments and associated responses or actions or based on a constrained set of possible user responses or actions (e.g., yes/no, approve/disapprove, queue, delegate) for a particular task. In some examples, a request or commitment where a smart reply suggestion is triggered is identified as a quick task 112. For example, a smart reply suggestion is a computer-determined suggestion of text, image, or audio that can be used as a complete or partial communication response.

In some examples, the determination of whether a task is a quick task 112 is based on a determination of whether a determined number of possible responses satisfy a predefined threshold (e.g., two possible responses, up to five possible responses). A particular response is not limited to a particular word or phrase, but can be comprised of a variety of text or images for which the meaning of the particular response can be inferred, for example, by NLP. As one example, the user may respond to a request with an utterance of "yeah" or "yes," with an input of a thumbs-up emoji (e.g., selected on a hardware or displayed keyboard, input via a user gesture, input via a voice command), or a selection of a "yes" option displayed on a GUI on a screen of the user's client computing device 102. Although each of these user responses is different, they all represent an affirmative response or can be inferred to mean "yes." In some examples, the determination of whether a task is a quick task 112 is based on a determination of whether the task can be processed on behalf of the user with limited user interaction (e.g., approving a time-off request, approving an expense report, approving a document access request, sending content).

According to another aspect, amenability to presentation via an audio channel can be determined based on a determination of whether a companion device (e.g., with a screen) may be needed (e.g., based on user preferences, based on internal policies, based on historic interaction data), for example, for viewing data prior to providing a response. As an example, the user may be sent an expense report with a request to approve the report. Internal policies may dictate that the user review accompanying documentation for approval. Accordingly, the classifier 214 may make a determination that an audio channel is not an appropriate means for acting on the task of approving the expense report, and thus does not classify the task as a quick task 112. In some implementations, the classifier 214 can determine whether a display is needed to complete a quick task 112, and when a determination is made that a display is needed, can store the quick task in a task store 206 in the form of a task notification that includes a description of the quick task and contextual criteria of a display. Accordingly, when the task notification's contextual trigger (e.g., user presence on a client computing device 102 with a display) is determined to have been satisfied (e.g., by monitoring context data for client computing devices associated with the user), the quick task notification can be communicated to the client computing device and presented to the user. Amenability to presentation via an audio channel can be determined based on a variety of other factors, such as whether a certain application 238 needed to act on the task is operable on the user's client computing device 102, whether the user's client computing device is operating on a corporate network (e.g. according to internal policies), etc.

According to an aspect, example techniques for identifying and extracting task content from various forms of electronic content items 204 and for classifying task content as a quick task 112 include language analysis of the content. In some examples, human annotators may annotate task content as containing commitments or requests. In some examples, human annotators may further annotate task content as a quick task 112. Human annotations may be used in a process of generating a corpus of training data that is used to build and to test automated extraction of quick tasks 112 and various properties about quick tasks. Techniques may also involve proxies for human-generated labels (e.g., based on email engagement data or relatively sophisticated extraction methods). For developing classifier 214 methods for identifying and/or inferring quick tasks 112 and their properties, analyses can include NLP analyses at different points along a spectrum of sophistication. For example, an analysis having a relatively low-level of sophistication may involve identifying keywords based on simple word breaking and stemming. An analysis having a relatively mid-level of sophistication may involve consideration of larger analyses of sets of words ("bag of words"). An analysis having a relatively high-level of sophistication may involve sophisticated parsing of sentences in content items 204 into parse trees and logical forms. Techniques for identifying and extracting task content and quick tasks 112 may involve identifying attributes or "features" of components of content items 204 and sentences of the content items. Such techniques may employ such features in a training and testing paradigm to build a statistical model to classify components of content item 204. For example, such components may comprise sentences or the overall content item 204 as containing a request and/or commitment and also identify and/or summarize the text that best describes the request and/or commitment.

In some examples, techniques for extraction involve a hierarchy of analyses, including using a sentence-centric approach, consideration of multiple sentences in a content item 204, and global analyses of relatively long communication threads. In some implementations, multiple content sources 202 associated with particular content items 204 may be considered. Such content sources 202 may include histories and/or relationships of/among people associated with particular communications, locations of the people during a period of time, calendar information of the people, and multiple aspects of organizations and details of organizational structure associated with the people.

In some examples, techniques may directly consider requests or commitments identified from components of content as representative of the requests or commitments, or may be further summarized. Techniques may extract other information from a sentence or larger content item 204, including relevant dates (e.g., deadlines on which requests or commitments are due), locations, urgency, time-requirements, task subject matter (e.g., a project), and people. In some implementations, a property of extracted task content is determined by attributing commitments and/or requests to particular authors of a content item 204.

Beyond text of a content item 204, techniques can consider other information for extraction and summarization, such as images and other graphical content, the structure of the content item, the subject header (e.g., of a communication item), length of the content item, position of a sentence or phrase in the content item, date/time a communication item was sent, and information on the sender and recipients of the communication item, just to name a few examples. In some implementations, a technique may further refine or prioritize initial analyses of candidate content or resulting extractions based, at least in part, on the sender or recipient(s) and histories of communication and/or of the structure of the organization.

In some examples, techniques may include analyzing features of various communications beyond a current communication item (e.g., email, text message, chat message, social media post). For example, techniques may consider interactions between or among commitments and requests, such as whether an early portion of a communication thread contains a commitment or request, the number of commitments and/or requests previously made between two (or more) users of the communication thread, etc.

In some examples, techniques may include analyzing features of various communications that include conditional task content commitments or requests. For example, a conditional commitment may be "If I see him, I'll let him know." A conditional request may be "If Bob sends you a time-off request, please request a sub to fill in."

In some examples, techniques include augmenting extracted task content (e.g., commitments and/or requests) with additional information such as deadlines, identification (e.g., names, ID number, and so on) of people associated with the task content, and places that are mentioned in the task content.

In some examples, a computing system constructs predictive models for identifying and extracting quick tasks 112 and related information using machine learning procedures that operate on training sets of annotated corpora of sentences or messages (e.g., machine learning features). In other examples, a computing system may use relatively simple rule-based approaches to perform extractions and summarization.

In some examples, a computing system may explicitly notate task content extracted from a message in the message itself. In various implementations, a computing system may flag content items 204 containing quick tasks 112 in multiple electronic services and experiences.

According to an aspect, the audio channel quick task system 200 includes a prioritization engine 216 illustrative of a software module, software package, system, or device operative or configured to prioritize or rank identified quick tasks 112. According to some implementations, the prioritization engine 216 ranks quick tasks 112 based on an inferred importance and/or relevance of the quick task to the user, wherein a higher ranking quick task 112 (i.e., a quick task having a higher priority score) is determined to be more important or relevant to the user than a lower ranking quick task (i.e., a quick task having a lower priority score). "Importance" of a quick task 112 to the user can be determined based on content and/or attributes extracted from the quick task, such as one or a combination of: user-selected priority, a relevant date (e.g., deadline on which a request or commitment is due), location, urgency, time-requirement, task subject matter, people, and age of the quick task. Additionally, "importance" of a quick task 112 to the user can be determined based in part on user data stored in the user knowledge store 236. As an example, a quick task 112 comprising a request from the user's manager may have a higher priority score and thus be ranked higher than a quick task from a socially-distant co-worker of the user. As another example, the prioritization engine 216 may score a quick task 112 that includes an indication of urgency (e.g., "ASAP," "urgent," "really need to know") within the text of the quick task or within the context of the quick task with a higher priority score than a quick task that does not include an indication of urgency. As another example, a quick task 112 extracted from an email with a subject heading associated with an upcoming meeting on the user's calendar may be scored and ranked higher than a quick task 112 that is not associated with an upcoming meeting or appointment. In some implementations, such as when there is not enough known user data to confidently prioritize a quick task 112 for a specific user, cohort data or general user data can be used to prioritize a quick task.

According to an aspect, the audio channel quick task system 200 includes a context engine 218 illustrative of a software module, software package, system, or device operative or configured to monitor user context data and contextual data for a client computing device 102 associated with the user. In various implementations, the context engine 218 determines user context and client computing device 102 context based on one or a combination of context data collected by the personal digital assistant 208, context data stored in one or more local knowledge stores 240, and context data communicated with and stored in the user knowledge store 236. The context engine 218 is configured to communicate context data to the prioritization engine 216. According to an aspect, a quick task's priority score and ranking can fluctuate based on user context data and/or contextual data for a client computing device 102 associated with the user. For example, context data can indicate that the user has an upcoming meeting with a particular co-worker. Accordingly, prior to the meeting or shortly following the meeting, a quick task 112 comprising a request of the user by the particular co-worker that can be satisfied with a quick response (e.g., yes/no response, approving a document access request) or a quick action (e.g., sending content, scheduling a meeting) can be ranked higher than another quick task that is not associated with the particular co-worker.

According to an aspect, the context engine 218 is further operative to communicate context data to an output manager 220 illustrative of a software module, software package, system, or device operative or configured to determine whether conditions are favorable for exposing a quick task 112 to the user via a speaker 210 based on current user and client computing device 102 context. For example, favorable conditions can indicate an environment in which a quick task 112 can be played via a speaker 210 within a particular level of intrusiveness. Intrusiveness can be associated with a level of disruption to the user, other individuals around the user, or to particular processes executing on the user's client computing device 102. According to an aspect, the output manager 220 is operative to calculate a condition favorability score indicative of a level of favorability of conditions to exposing a quick task 112 to the user via an audio channel at a given time. For example, conditions can be determined to be highly-favorable when the user is not engaged in an activity or when the user's client computing device 102 is not executing certain processes, while conditions can be determined to be less-favorable when the user is engaged in certain activities or when the user's client computing device is executing certain processes.

According to an aspect, a condition favorability score can be calculated based on an analytical scoring rubric, where attributes of user context and client computing device context are used alone or in combination with quick task attributes to calculate the condition favorability score. Attributes and scores of the analytical scoring rubric can be based on one or a combination of preconfigured settings, user preferences, historic user interaction data, user feedback, laws and/or policies, and the like. Conditions can be determined to be favorable for audible exposure for a particular quick task 112 when a calculated condition favorability score for the particular quick task meets a determined threshold (e.g., within a determined score range, is at a particular ranked position).

As an example, context data can indicate that the user's client computing device 102 embodied as a mobile phone is on silent (e.g., the ringer is turned off), which can be determined to be an unfavorable condition for exposing a quick task 112 to the user through the mobile phone's speaker. As another example, context data can indicate that the user is commuting to work in a connected automobile, which can be determined to be a favorable condition (based on a calculated condition favorability score) for exposing a quick task 112 to the user via a speaker 210, such as through the automobile's audio system. For example, the quick task 112 can be communicated to the user via the user's phone (a client computing device 102) As another example, while context data can indicate that the user is commuting to work in an automobile, the context data can further indicate that the user is commuting in the automobile with several other people, which can be determined (based on a calculated condition favorability score) to not be a favorable condition for exposing a quick task 112 to the user via the automobile's audio system. As another example, context data can indicate that the user is commuting to work in an automobile with other people but that the user is using earbuds which can be determined to be a favorable condition for exposing a quick task 112 to the user via the earbuds. As another example, context data can indicate that the user is not busy; however, based on historic interaction data, it may be inferred that the user prefers to not be disturbed at a particular time (e.g., in the morning before 9:00 AM, in the afternoon between 12-2 PM, in the evening after 6 PM), at a particular location (e.g., at work, at home), or while engaged in a particular activity (e.g., driving, walking, when listening to music, while watching television), and thus, the output manager 220 can determine that conditions are not favorable for exposing a quick task 112 to the user. As another example, based on context data, a determination can be made that conditions are favorable to expose a quick task 112 to the user; however, the particular attributes of the user's context can be used to determine that conditions are not favorable for exposing a particular type of quick task (e.g., personal-related task, work-related task) via an audio channel.

According to some implementations, a determination of whether to audibly expose a quick task 112 to the user at a given time can be based on a combined factor of the level of favorability of conditions and the level of importance of a quick task. For example, a determination can be made to only present lower-ranking (i.e., in terms of importance) quick tasks 112 to the user when conditions to audibly expose a quick task 112 are highly favorable (based on a calculated condition favorability score), such as when the user is not engaged in an activity based on monitored context data, while highly-ranked (importance) quick tasks may be exposed to the user via a speaker 210 when conditions to audibly present a quick task 112 are determined to be somewhat favorable to highly favorable (based on a calculated condition favorability score). In some implementations, when the user's current context and client computing device 102 context indicate that conditions are not favorable for presenting the quick task 112 to the user via an audio channel at the current time, the quick task can be stored in a task store 206 that can store tasks in the form of task notifications that include a description of the quick task and contextual criteria (e.g., when the user starts/finishes a task, when a video playback application is opened/closed on the user's client computing device, when another user's presence is detected near the user, when an auxiliary speaker 210 is connected to the user's client computing device) for triggering a presentation of the specific task to the user via an audio channel. Accordingly, when the contextual trigger associated with a task reminder is determined to have been satisfied (e.g., by monitoring context data for a client computing device 102 associated with a user), the quick task notification can be communicated to the client computing device and exposed to the user via a speaker 210.

Upon calculation of a quick task's priority score and a determination that conditions are favorable or appropriate for exposing the quick task 112 to the user via an audio channel (based on a calculated condition favorability score), the output manager 220 is further operative to generate a notification of the highly-ranked quick task and to pass the notification to the user's client computing device 102 for presenting the notification of the quick task to the user via a speaker 210 associated with the client computing device. In some examples, the user can make an explicit request for an audible presentation of stored or queued quick tasks 112. For example, the user can utter a request to the personal digital assistant 208, such as, "Tell me my pending quick tasks." Accordingly, quick task notifications stored in the task store 206 can be communicated to the client computing device 102 and exposed to the user via a speaker 210. The notification can include a statement of the request or commitment associated with the quick task 112 (e.g., "Did you feed the dogs?"). In some implementations, the notification can prompt the user with a call to action (e.g., "Did you feed the dogs? Would you like to respond?", "Please indicate whether you have fed the dogs."). In some implementations, the notification can include metadata, such as the requestor of the task, a time factor associated with the task, possible or suggested responses to the request, or actions that can be performed for satisfaction of the task (e.g., "Mom asks, 'Did you feed the dogs?' Please reply 'yes' or 'no.'").

According to an aspect, the client computing device 102 can receive a response from the user, for example, via an audio input device 230 (e.g., an integrated or paired microphone) or via another input/output control 232 (e.g., a keyboard, a mouse, a pen, a touch input device). In some implementations, the user response is received by the personal digital assistant 208 and is communicated to the audio channel quick task system 200. The audio channel quick task system 200 includes a response handler 222 illustrative of a software module, software package, system, or device operative to receive a user response, determine an action to take based on the user response, and to execute the determined action. In various implementations, the user response is in natural language form and is processed by the personal digital assistant 208 or the response handler 222 using natural language processing (NLP) techniques.

In some examples, the user response is associated with a task action, such as a reply to a question or request. Based on the reply, the response handler 222 can engage an application 238 (e.g., email application, LOB application, calendar application), the personal digital assistant 208, or a local or remote task action actor 234 to perform a task action on behalf of the user (e.g., setting an alarm, sending a message, performing a transaction). As an example, the quick task 112 may be a time-off request sent to the user via an LOB application, and the user response may be, "Approved." Accordingly, the response handler 222 sends a message to the LOB application that the time-off request is approved. In other examples, the user response is associated with an instruction to queue the task (e.g., "Snooze," "Remind me later"). In some examples, the user response includes a contextual trigger or condition (e.g., "Remind me when I log into my work computer," "Remind me when I get home"). Accordingly, the response handler 222 stores the quick task 112 in the task store 206 in the form of a task notifications that includes a description of the quick task and the contextual criteria, such that when the contextual trigger associated with the task reminder is determined to have been satisfied (e.g., by monitoring context data for a client computing device 102 associated with a user), the quick task notification can be communicated to the client computing device and presented to the user. In other examples, the user response is associated with a delegation of the task (e.g., "Delegate to Greg," "Forward this request to Marsha"). Accordingly, the response handler 222 forwards the quick task 112 to the person or bot specified by the user. In some implementations, prior to executing a determined action, the audio channel quick task system 200 confirms the user response or the determined action with the user. For example, the output manager can generate and pass a notification to the user's client computing device 102, wherein the notification can include a restatement of the user response and/or a statement of the action they system will take upon receiving confirmation from the user.

According to an aspect, components of the audio channel quick task system 200 use a computer learning model, such as a neural network or deep neural network, and can be trained and retrained by incorporating feedback from the user and/or other users (e.g., general population, cohorts). The user feedback can be explicit or implicit. For example, implicit feedback can include a user ignoring a quick task notification or using a quick task notification. Ignoring a quick task notification can be implicit negative feedback suggesting something is wrong with the quick task notification. In some cases, the exact problem with the quick task notification can be difficult to discern. In one example, the specific reason can be that the quick task 112 is not important, which can mean that the quick task 112 was correctly identified, but that the user does not deem it important enough for a quick task notification to be generated. In other words, completion of the task may be optional in the user's mind or something the user gets to eventually, but a notification is not wanted. In another example, the specific reason can be that the user does not need the personal assistant's help with the quick task 112. For example, the personal assistant may provide a quick task notification about a quick task 112 the user completes habitually. In this situation, the quick task 112 is correctly identified, but the quick task notification is unwelcome. User feedback can be inferred to suggest the quick task 112 was correctly identified, but that the audible presentation of a quick task notification is not deemed helpful by the user.

In some implementations, implicit negative feedback can suggest that an identified quick task 112 is not valid (e.g., not a commitment or request, not amenable to being surfaced audibly to the user, not amenable to receiving an audible response from the user). This is to be expected given the subjective nature of the task, the imperfect classification models for extracting tasks, and subtleties and nuances in human language/semantics that make it difficult to be correct all of the time. Providing feedback on errors associated with quick tasks 112 can help improve the performance of components of audio channel quick task system 200.

Utilization of a quick task notification is implicit positive feedback suggesting the quick task 112 was accurately identified and audibly surfaced at a convenient and/or relevant time. There may be other forms of implicit feedback. In some implementations, implicit feedback can be inferred from the completion of a quick task 112 after audibly exposing the notification to the user. For example, if Alice sends Peter an email which says, "Call me later tonight" a quick task notification may be presented to Peter. If Peter then calls Alice, then the technology can identify that Peter both heard the request notification and then proceeded to make a call to Alice. This can be positive feedback indicating that the quick task notification helped the user to accomplish the quick task 112. In some implementations, explicit user feedback can be provided via a survey or rating of specific quick task notifications, which can be provided via a GUI or via an audio channel.

According to an aspect, the audio channel quick task system 200 includes a feedback manager 224 illustrative of a software module, software package, system, or device operative or configured to collect user feedback and tune one or more components of the audio channel quick task system 200 (e.g., interface engine 212, classifier 214, prioritization engine 216, context engine 218, output manager 220, response handler 222) to the user's specific interests. In other words, the feedback manager 224 follows a schema that can be incorporated into the models for training purposes. In one aspect, the feedback is used to label content items 204 that were originally analyzed to generate the quick task notification. Processing the quick task notification with the additional annotated data can help train the models to take the desired action in the future. The desired actions can include extracting a valid quick task 112 more often and audibly presenting quick task notifications at the correct time with the correct level of intrusiveness.

Figure 3:
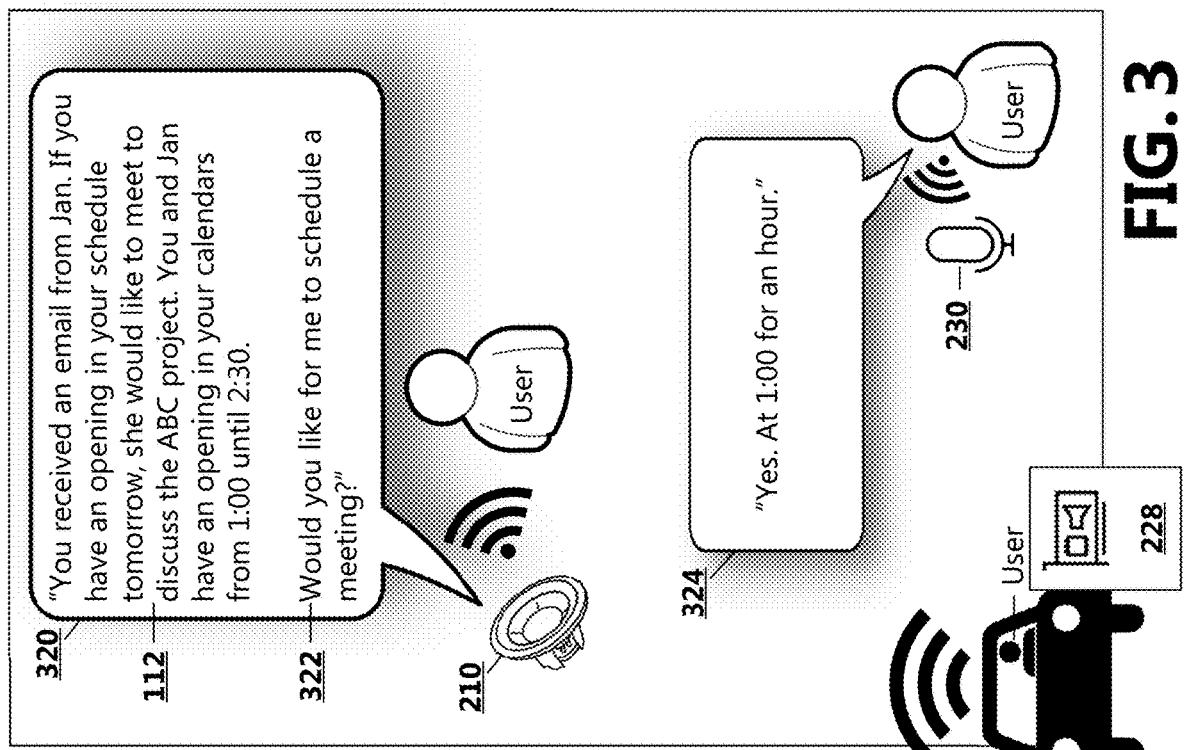
FIG. 3 illustrates an example use case scenario.
Figure 3:
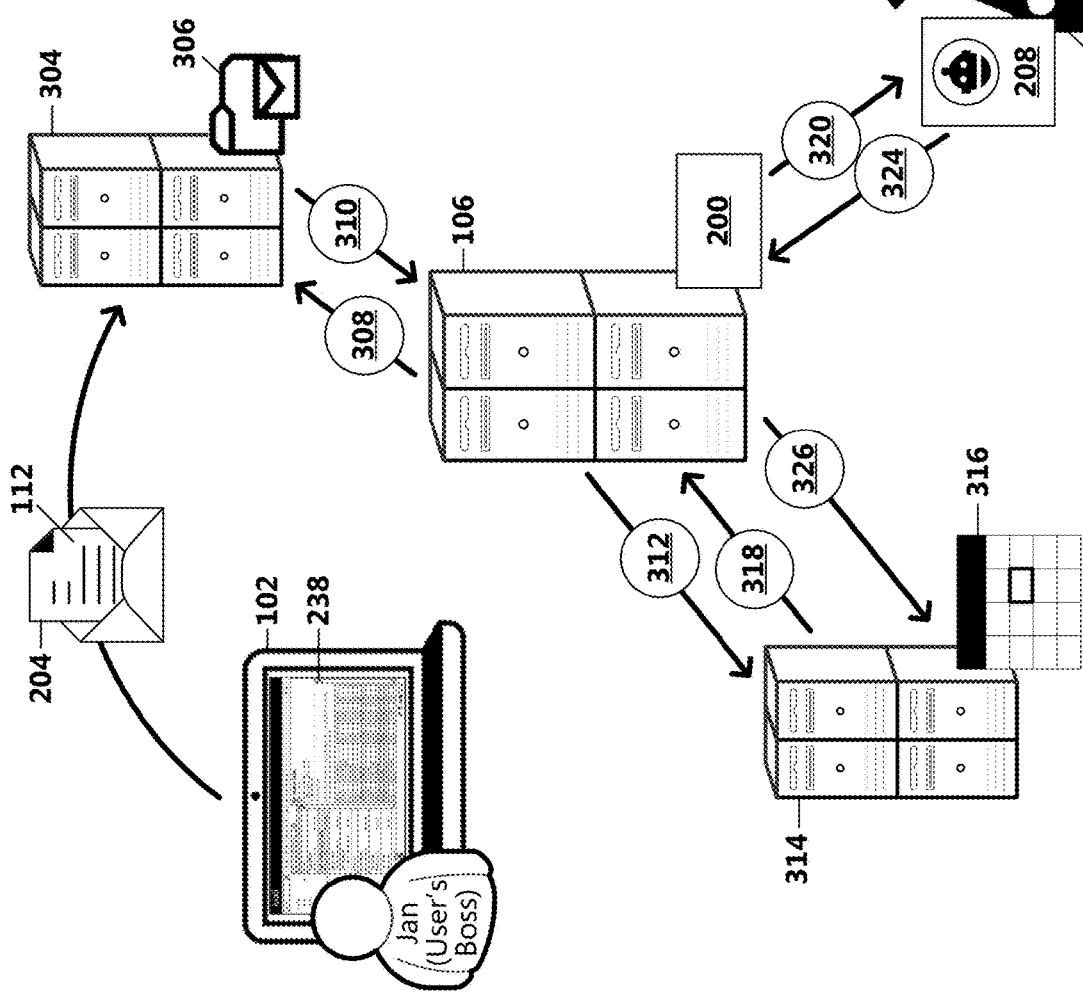

FIG. 3 illustrates an example use case scenario in accordance with an aspect of the technology described herein. With reference now to FIG. 3, a content item 204 embodied as an email message is composed by a user's boss, Jan. For example, Jan composes the email message using an email application 238 executing on her client computing device 102 embodied as a laptop computer. In the email, Jan makes the following request to the user, "If you have an opening in your schedule tomorrow, let's schedule a time to meet to discuss the ABC project." When Jan sends the email message, the email application 238 executing on the client computing device 102 passes the email message to an email server 304 for delivery to the user's mailbox 306. In some implementations and as shown in the illustrated example, the audio channel quick task system 200 fetches new data from the email server 304, for example, by making an API call 308 to the email server for new data 310, such as new email messages stored in the user's mailbox 306. In other implementations, the email server 304 automatically pushes new data 310 to the audio channel quick task system 200. In other implementations, the audio channel quick task system 200 fetches new data according to a schedule (e.g., every 5 minutes, every 15 minutes, hourly).

The audio channel quick task system 200 parses Jan's email message to the user, and identifies a task is expressed in the email as a request made to the user to meet. The task can be identified as a conditional task, for example, where meeting with Jan is conditioned on whether the user has an opening in his schedule. In the illustrated example, the audio channel quick task system 200 recognizes the conditional task and the task condition (e.g., opening in the user's schedule tomorrow) and automatically makes a call 312 to a data source, such as to a calendar server 314, for requesting data 318 (e.g., information from the user's calendar 316, information from Jan's calendar) needed to make a determination as to whether the task condition is satisfied. For example, based on data 318 extracted from the user's calendar 316 and Jan's calendar, the audio channel quick task system 200 can determine that the user and Jan have openings in their schedules tomorrow from 1:00 to 2:30.

Further, the audio channel quick task system 200 analyzes the identified task and classifies the task as a quick task 112. For example, the audio channel quick task system 200 may make a determination that the identified task is a quick task 112 based on a determination that the request can be easily communicated to the user via an audio channel, that the user can provide a quick response to the request, and that a quick action (i.e., scheduling a meeting) can be performed to satisfy the request. In addition, the audio channel quick task system 200 accesses and analyzes context data (e.g., user context data, the user's client computing devices' 102 context data) for calculating a priority score for the quick task 112 and a condition favorability score indicative of a level of favorability of conditions for presenting the quick task to the user via an audio channel. For example, the audio channel quick task system 200 can calculate the priority score for the quick task 112 based at least in part on the time factor associated with the request (i.e., tomorrow) and the requestor (i.e., the user's boss), and can calculate the condition favorability score based at least in part on the user's current activity and the statuses of the user's client computing devices 102 (according to collected context data) and user preferences and settings (e.g., including explicitly-set user preferences and settings and inferred user preferences and settings as understood based on user feedback).

In the illustrated example, the audio channel quick task system 200 determines to proactively engage the user with a quick task notification 320 via an audio channel based on the calculated priority score and condition favorability score. For example, the audio channel quick task system 200 generates a notification of the quick task 112, and determines that conditions are favorable for audibly exposing the quick task to the user. Accordingly, the audio channel quick task system 200 sends the quick task notification 320 to a relevant user client computing device 102, which in the illustrated example is the user's connected automobile that is being driven by the user on which an instance of the personal digital assistant 208 is installed and executed. For example, the personal digital assistant 208 receives the quick task notification 320, and employs the automobile's sound system (e.g., audio output device 228, speakers 210) to expose the quick task notification to the user as audio output in the form of sound waves. For example, the quick task notification 320 includes a statement of the quick task 112 and includes a call-to-action 322, such as prompting the user to respond to the personal digital assistant 208 with an instruction for satisfying the quick task. As illustrated, the user provides a response 324, which is received by the personal digital assistant 208 and passed to the audio channel quick task system 200. In the illustrated example, the user response 324 includes an instruction to schedule a meeting on behalf of the user. Accordingly, the audio channel quick task system 200 passes the instruction 326 to a relevant task action actor 234, which in this example is the calendar server 314.

Figure 4:
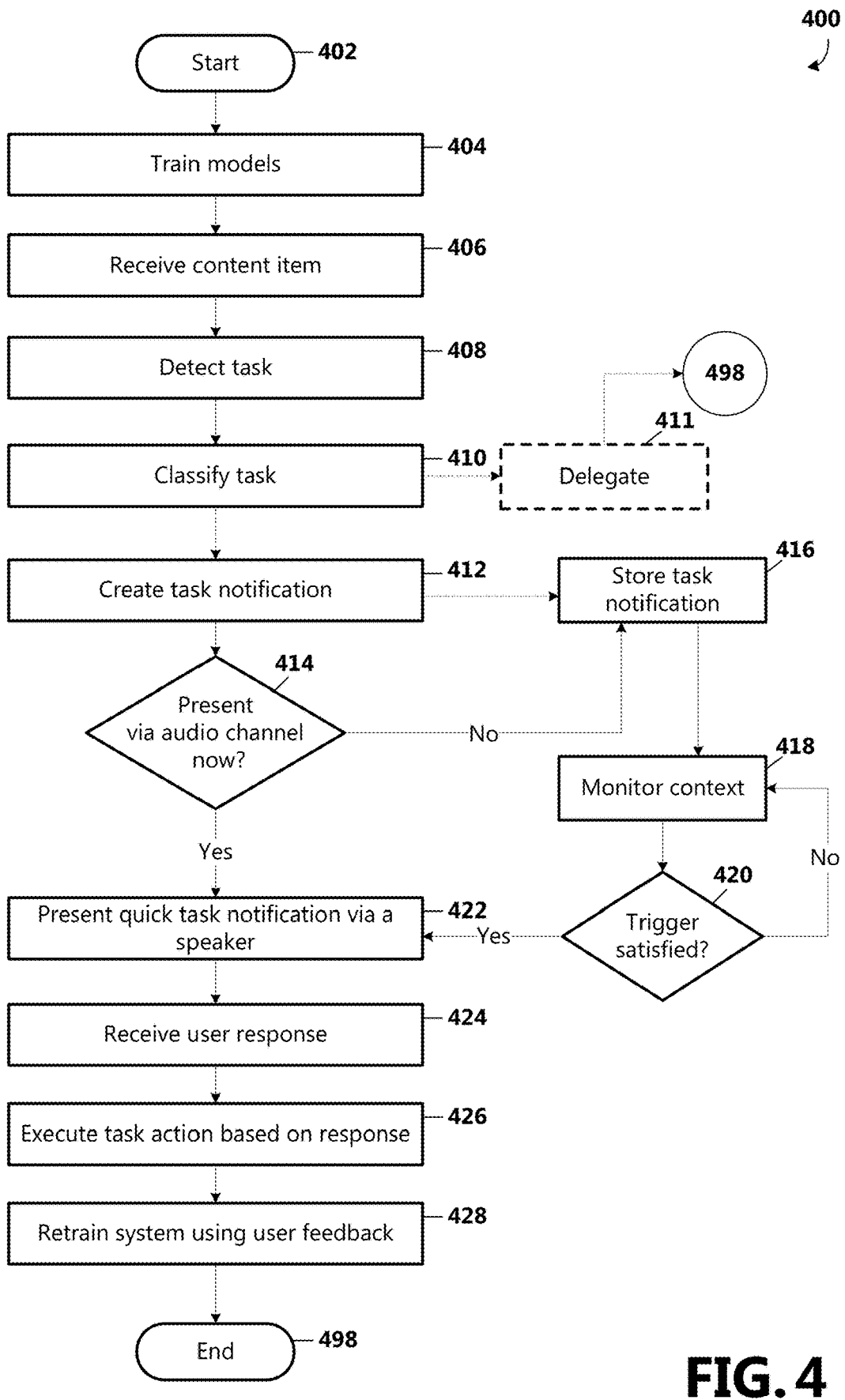
FIG. 4 is a flow chart showing general stages involved in an example method for providing a more efficient user interface that enables users to respond to tasks quickly by providing automated quick task notifications via an audio channel.

Having described an operating environment 100, an example system 200, and example use case scenarios with respect to FIGS. 1, 2, and 3, FIG. 4 is a flow chart showing general stages involved in an example method 400 for providing a more efficient user interface that enables users to respond to tasks quickly by providing automated quick task notifications 320 via an audio channel. With reference now to FIG. 4, the method 400 begins at start OPERATION 402, and proceeds to OPERATION 404, where the classifier 214, the prioritization engine 216, context engine 218, output manager 220, and response handler 222 are trained using training data.

At OPERATION 406, one or more structured and/or unstructured content items 204 are received from one or more content sources 202. For example, one or more structured and/or unstructured content items 204 can be fetched by the interface engine 212 or pushed to the interface engine.

The method 400 continues to OPERATION 408, where a content item 204 of the one or more structured and/or unstructured content items are analyzed by the classifier 214 for determining to identify a task, such as an explicitly-defined task item or a request or commitment expressed in the content item.

At OPERATION 410, the classifier 214 analyzes the identified task for determining whether the task is a quick task 112, for example, a task for which a notification for the task is amenable to being presented to a user via an audio channel and that can be processed with a quick action (e.g., quick reply, simple action). If the task is determined to not be a quick task 112, the method 400 can optionally proceed to OPERATION 412, where a task notification for the task is created and stored in a task store 206 in the form of a task notifications that includes a description of the quick task and the contextual criteria (OPERATION 416). When the contextual trigger associated with the task reminder is determined to have been satisfied (DECISION OPERATION 420) by monitoring context data for a client computing device 102 associated with a user (OPERATION 418), the quick task notification can be communicated to the client computing device and presented to the user (OPERATION 422). Alternatively, the method 400 can proceed to OPTIONAL OPERATION 411 where the identified task is delegated to another user or bot and end at OPERATION 498.

Alternatively, if the task is determined to be a quick task 112, the method 400 proceeds to OPERATION 412, where a task notification for the task is created and then to DECISION OPERATION 414, where a determination is made as to, based at least in part on the user's current context, whether to present the quick task 112 to the user via an audio channel. For example, the determination can be based on one of or a combination of a calculated prioritization score (e.g., based on attributes of the quick task 112) and a calculated condition favorability score (e.g., based on user context and context of the user's client computing device 102, settings, preferences). For example, a positive determination is made when the quick task 112 has been determined to be at a level of importance and relevance to the user to present a notification of the quick task to the user via an audio channel at the present time and that the user's context and/or the user's client computing device's context is/are favorable for presenting the quick task notification 320 to the user via an audio channel at the present time.

If a determination is made to not present the quick task 112 to the user via an audio channel at the current time (i.e., a negative determination), the method 400 proceeds to OPERATION 416 where the task notification 320 is stored in a task store 206 with contextual trigger criteria. If a determination is made to present the quick task 112 to the user at the current time, the method 400 proceeds to OPERATION 422, where the quick task notification 320 is passed to the audio output device 228 of a client computing device 102 of the user, and played through a speaker 210 connected (wired or wirelessly) to the client computing device for exposing the quick task notification to the user.

At OPERATION 424, a user response 324 is received via an audio input device 230 or another I/O control 232, and is passed to the response handler 222 of the audio channel quick task system 200. At OPERATION 426, the response handler 222 analyzes the user response 324, determines an action to take based on the user response, and executes the determined action (e.g., queue the quick task notification 320, delegate to another user or bot, ignore the quick task, pass an instruction 326 to a task action actor 234 (e.g., personal digital assistant 208, application 238, LOB application) to execute the action).

At OPERATION 428 one or more of the classifier 214, prioritization engine 216, context engine 218, output manager 220, and response handler 222 are retrained using implicit and or explicit user feedback as inputs. The method 400 ends at END OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
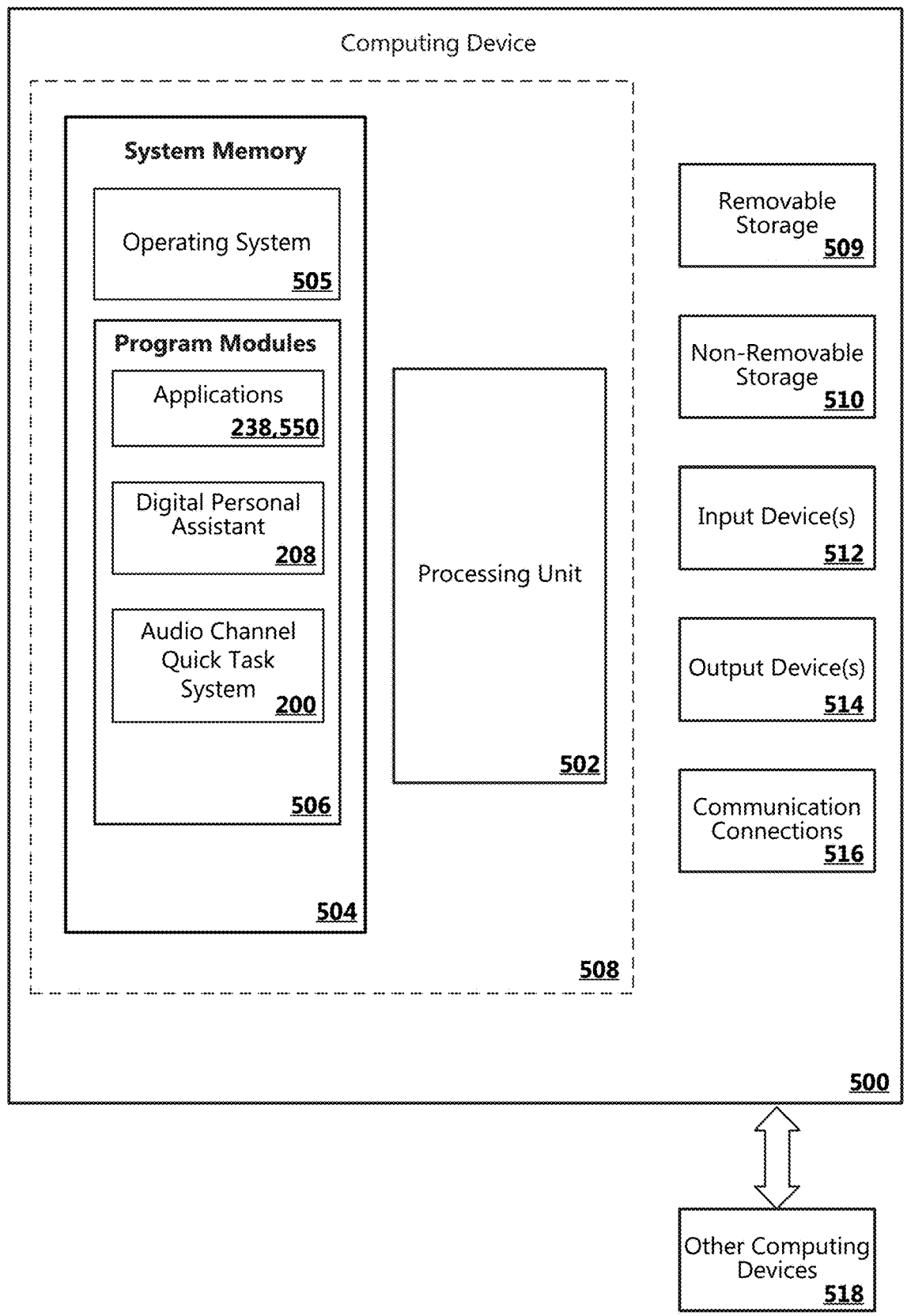
FIG. 5 is a block diagram illustrating example physical components of a computing device.
Figure 6A:
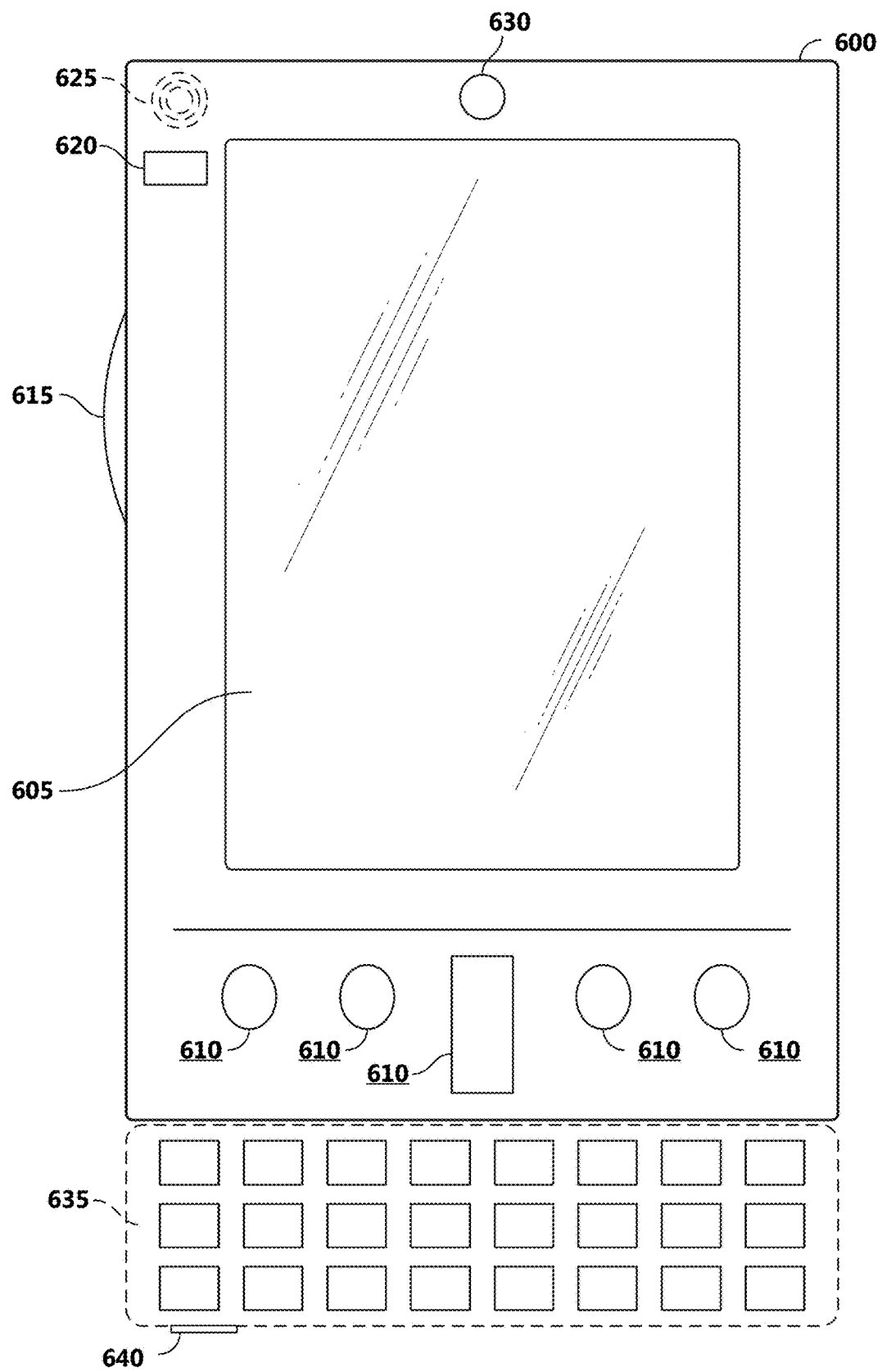
FIGS. 6A and 6B are block diagrams of a mobile computing device.
Figure 6B:
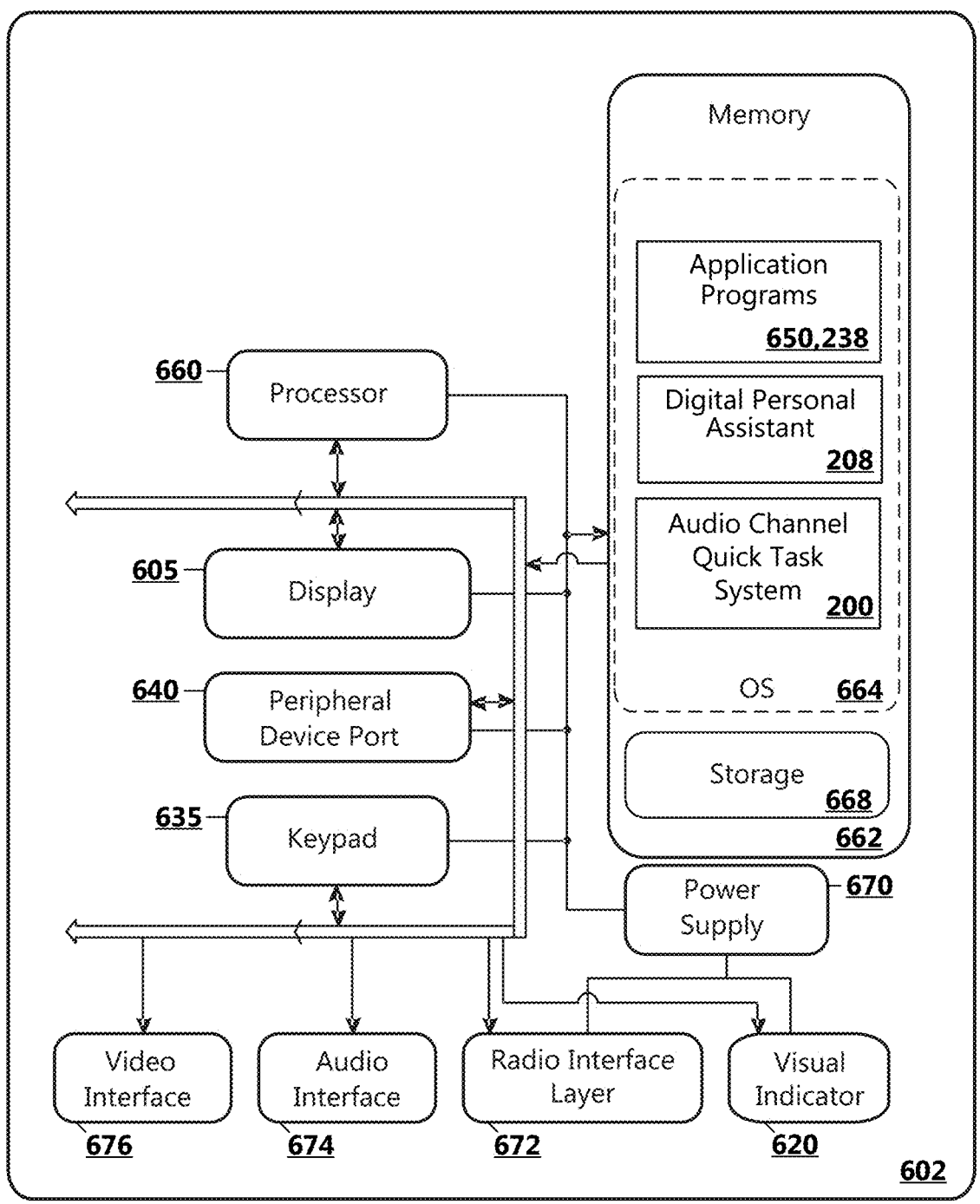
Figure 7:
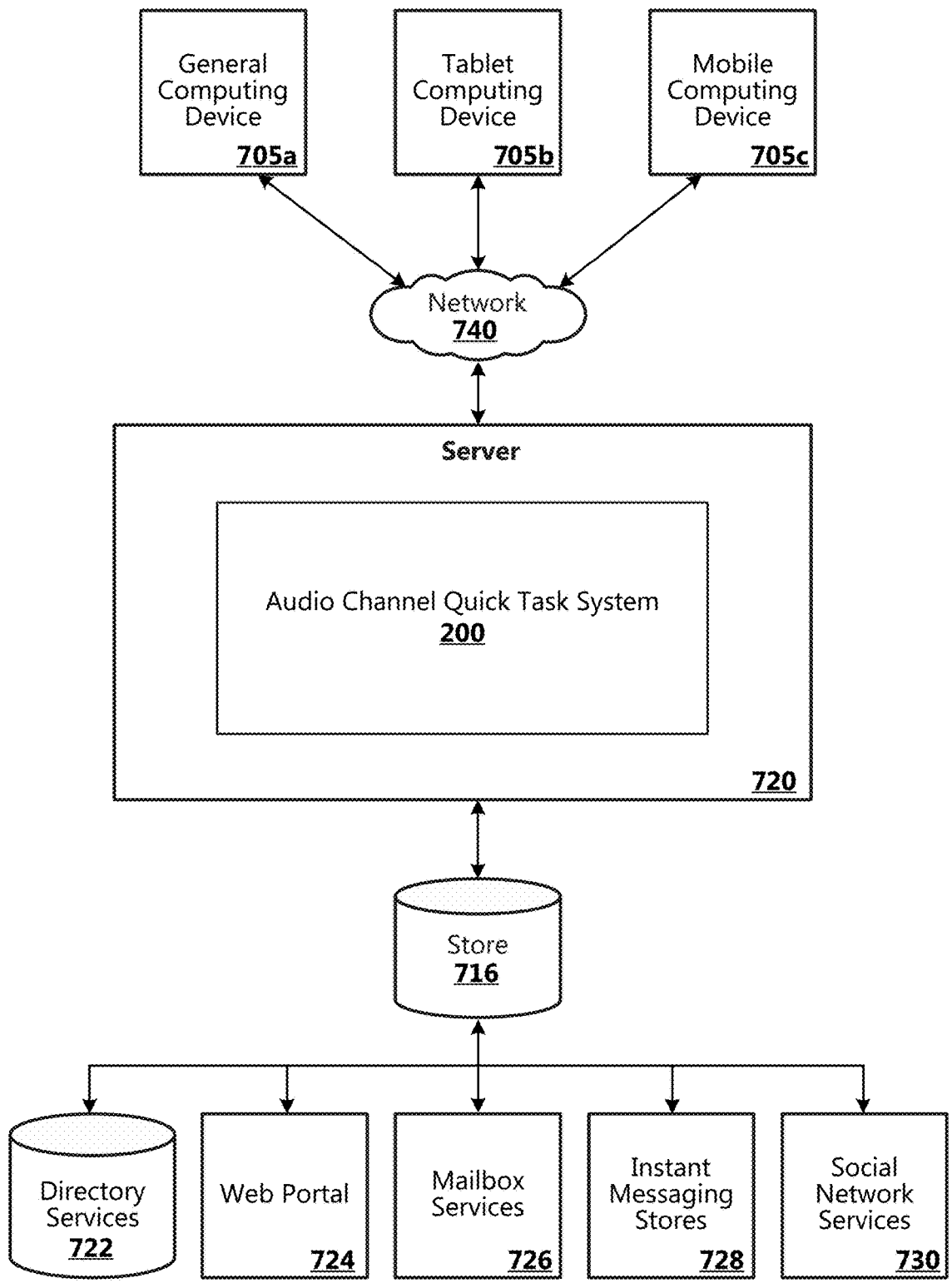
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550, 238. According to an aspect, the system memory 504 includes the personal digital assistant 208. According to another aspect, the system memory 504 includes one or more components of the audio channel quick task system 200. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., application 238, personal digital assistant 208, one or more components of the audio channel quick task system 200) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the personal digital assistant 208 is loaded into the memory 662 and run on or in association with the operating system 664. According to another aspect, one or more components of the audio channel quick task system 200 are loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668. According to an aspect, data/information generated or captured by the mobile computing device 600 and stored via the system 602 is stored locally on the mobile computing device 600, as described above. According to another aspect, the data is stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing automated quick task notifications via an audio channel as described above. Content developed, interacted with, or edited in association with the one or more components of the audio channel quick task system 200 are enabled to be stored in different communication channels or other storage types. For example, various documents may be stored using a directory service 722, a web portal 724, a mailbox service 726, an instant messaging store 728, or a social networking site 730. One or more components of the audio channel quick task system 200 are operative or configured to use any of these types of systems or the like for providing automated quick task notifications via an audio channel, as described herein. According to an aspect, a server 720 provides the one or more components of the audio channel quick task system 200 to client computing devices 705a,b,c. As one example, the server 720 is a web server providing one or more components of the audio channel quick task system 200 over the web. The server 720 provides one or more components of the audio channel quick task system 200 over the web to clients 705 through a network 740. By way of example, the computing device is implemented and embodied in a personal computer computing device 705a, a tablet computing device 705b or a mobile computing device 705c (e.g a smart phone), or other computing device. Any of these examples of the computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for providing automated quick task notifications via an audio channel, the system comprising:
  at least one processing device; and
  at least one computer readable data storage device storing instructions that, when executed by the at least one processing device, cause the system to:
  provide an interface engine operative to receive a structured or unstructured content item associated with a user from a content source;
  provide a classifier operative to:
  identify a task expressed in the content item;
  determine whether the identified task is a quick task, wherein a quick task is a task that is amenable to being presented via an audio channel and can be processed with a quick action; and
  in response to a determination that the identified task is a quick task:
  rank the identified quick task based on a calculated prioritization score; and
  determine, based on one or a combination of the calculated prioritization score and monitored context data, whether conditions are favorable for exposing the identified quick task to the user via an audio channel; and
  provide an output manager operative to:
  in response to a determination that conditions are favorable for exposing the identified quick task to the user via an audio channel:
  generate a quick task notification; and
  pass the quick task notification to a client computing device with which the user is associated, such that an audio output device executing on the client computing device can produce an audible presentation of the quick task notification on the client computing device that can be heard through a speaker.

2. The system of claim 1, wherein the system is further operative to provide a response handler operative to:
  receive a user response to the quick task notification;
  process the user response for determining an action to take based on the identified quick task and the user response; and
  execute the determined action.

3. The system of claim 2, wherein the determined action is one of:
  delegating the identified quick task to another user or bot;
  queuing the quick task notification in a task store; or
  passing an instruction to a task action actor.

4. The system of claim 3, wherein the task action actor comprises one of:
  a personal digital assistant;
  a line of business application;
  an email application;
  a messaging application; or
  a calendar application.

5. The system of claim 3, wherein in queuing the quick task notification in the task store, the system is further operative to:
- generate a quick task notification comprising a description of the identified quick task and contextual trigger criteria;
- store the quick task notification in the task store;
- monitor context data for the user and one or more client computing devices associated with the user for determining when the contextual trigger criteria have been satisfied; and
- when a determination is made that the contextual trigger criteria have been satisfied, pass the quick task notification to a client computing device with which the user is associated for presentation of the quick task notification to the user.

6. The system of claim 2, wherein the system is further operative to provide a feedback manager operative to:
- collect user feedback, wherein user feedback includes one or more of:
  - explicit user feedback; and
  - implicit user feedback;
- tune one or more of the interface engine, classifier, and the response handler using the collected user feedback for training one or more of the interface engine, classifier, and the response handler to take a desired action in the future.

7. The system of claim 1, wherein in identifying the task expressed in the content item, the classifier is operative to:
- identify one of:
  - an explicit task item;
  - a request made of the user to perform a task action; or
  - a commitment made by the user to perform a task action.

8. The system of claim 1, wherein amenability to presentation via the audio channel is determined based on at least one of:
- a determination of possible responses to the task;
- whether a companion device with a screen is needed to handle the task;
- whether an application needed to process the task is operable on the client computing device with which the user is associated; and
- whether a network on which the client computing device is connected satisfies a network requirement for processing the task.

9. The system of claim 1, wherein the quick action comprises at least one of:
- a communication response;
- approving or denying a request;
- sending content;
- passing an instruction to a task action actor; and
- scheduling a calendar item.

10. The system of claim 1, wherein the prioritization score is calculated based on one or a combination of an inferred importance and relevance of the identified quick task to the user, wherein importance is inferred based on one or a combination of content and attributes extracted from the identified quick task comprising:
- user-selected priority;
- a relevant date;
- location;
- an indication of urgency;
- task subject matter;
- people; and
- age of the identified quick task.

11. The system of claim 1, wherein in making the determination that conditions are favorable for exposing the identified quick task to the user via the audio channel, the output manager is operative to calculate a condition favorability score, wherein the condition favorability score indicates a level of intrusiveness associated with a level of disruption of an audibly-played quick task, via a speaker, to the user or to processes executing on the user's client computing device, and is calculated based on the user's context and the context of the user's client computing device.

12. The system of claim 1, wherein when a determination is made that conditions are not favorable for exposing the identified quick task to the user via an audio channel, the output manager is operative to:
- generate a quick task notification comprising a description of the identified quick task and contextual trigger criteria; and
- store the quick task notification in a task store.

13. The system of claim 12, wherein the system is further operative to:
- monitor context data for the user and one or more client computing devices associated with the user for determining when the contextual trigger criteria have been satisfied; and
- when a determination is made that the contextual trigger criteria have been satisfied, pass the quick task notification to the client computing device with which the user is associated for presentation of the quick task notification to the user.

14. A computer-implemented method for providing automated quick task notifications via an audio channel, the method comprising:
- receiving a structured or unstructured content item associated with a user from a content source;
- identifying a task expressed in the content item;
- determining whether the identified task is a quick task, wherein a quick task is a task that is amenable to being presented via an audio channel and can be processed with a quick action; and
- in response to a determination that the identified task is a quick task:
  - ranking the identified quick task based on a calculated prioritization score;
  - determining, based on one or a combination of the calculated prioritization score and context data, whether conditions are favorable for exposing the identified quick task to the user via an audio channel; and
- in response to a determination that conditions are favorable for exposing the identified quick task to the user via an audio channel:
- generating a quick task notification; and
- passing the quick task notification to a client computing device with which the user is associated, such that an audio output device executing on the client computing device can produce an audible presentation of the quick task notification on the computing device that can be heard through a speaker.

15. The method of claim 14, further comprising:
- receiving a user response to the quick task notification;
- processing the user response for determining an action to take based on the user response; and
- executing the determined action, wherein executing the determined action comprises one of:
  - delegating the identified quick task to another user or bot;
  - queuing the quick task notification in a task store; or passing an instruction to a task action actor, wherein the task action actor comprises one of:
a personal digital assistant;
a line of business application;
an email application;
a messaging application; or
a calendar application.

16. The method of claim 14, wherein identifying a task comprises: identifying one of:
an explicit task item;
a request made of the user to perform a task action; or
a commitment made by the user to perform a task action.

17. The method of claim 14, wherein determining whether the identified quick task is amenable to being presented via the audio channel is based on one or a combination of:
a determination of possible responses to the task;
a determination of whether a companion device with a screen is needed to handle the task;
a determination of whether an application needed to process the task is operable on the client computing device with which the user is associated; and
a determination of whether a network on which the client computing device is connected satisfies a network requirement for processing the task.

18. The method of claim 14, wherein ranking the identified quick task based on a calculated prioritization score comprises calculating the prioritization score based on one or a combination of an inferred importance and relevance of the identified quick task to the user, wherein importance is inferred based on one or a combination of content and attributes extracted from the identified quick task comprising:
user-selected priority;
a relevant date;
location;
an indication of urgency;
task subject matter;
people; and
age of the identified quick task.

19. The method of claim 14, wherein making the determination that conditions are favorable for exposing the identified quick task to the user via the audio channel comprises:
calculating a condition favorability score, wherein the condition favorability score indicates a level of intrusiveness associated with a level of disruption of an audibly-played quick task, via a speaker, to the user or to processes executing on the user's client computing device, and is calculated based on the user's context and the context of the user's client computing device; and
when the condition favorability score satisfies a determined threshold, determining that conditions are favorable for exposing the identified quick task to the user via the audio channel.

20. Computer storage media including computer readable instructions, which when executed by a processing unit, the processing unit is configured to:
receive a structured or unstructured content item associated with a user from a content source;
identify a task expressed in the content item;
determine whether the identified task is a quick task, wherein a quick task is a task that is amenable to being presented via an audio channel and can be processed with a quick action; and
in response to a determination that the identified task is a quick task:
rank the identified quick task based on a calculated prioritization score;
determine, based on one or a combination of the calculated prioritization score and context data, whether conditions are favorable for exposing the identified quick task to the user via an audio channel;
in response to a determination that conditions are favorable for exposing the identified quick task to the user via an audio channel:
generate a quick task notification; and
pass the quick task notification to a client computing device with which the user is associated, such that an audio output device executing on the client computing device can produce an audible presentation of the quick task notification on the computing device that can be heard through a speaker; and
when a determination is made that conditions are not favorable for exposing the quick task to the user via an audio channel:
generate a quick task notification comprising a description of the identified quick task and contextual trigger criteria;
store the quick task notification in a task store;
monitor context data for the user and one or more client computing devices associated with the user for determining when the contextual trigger criteria have been satisfied; and
when a determination is made that the contextual trigger criteria have been satisfied, pass the quick task notification to a client computing device with which the user is associated, such that an audio output device executing on the client computing device can produce an audible presentation of the quick task notification on the computing device that can be heard through a speaker.

* * * * *